July 21, 1964 W. S. MAPEL ETAL 3,141,583
INJECTION GUN
Filed March 23, 1962
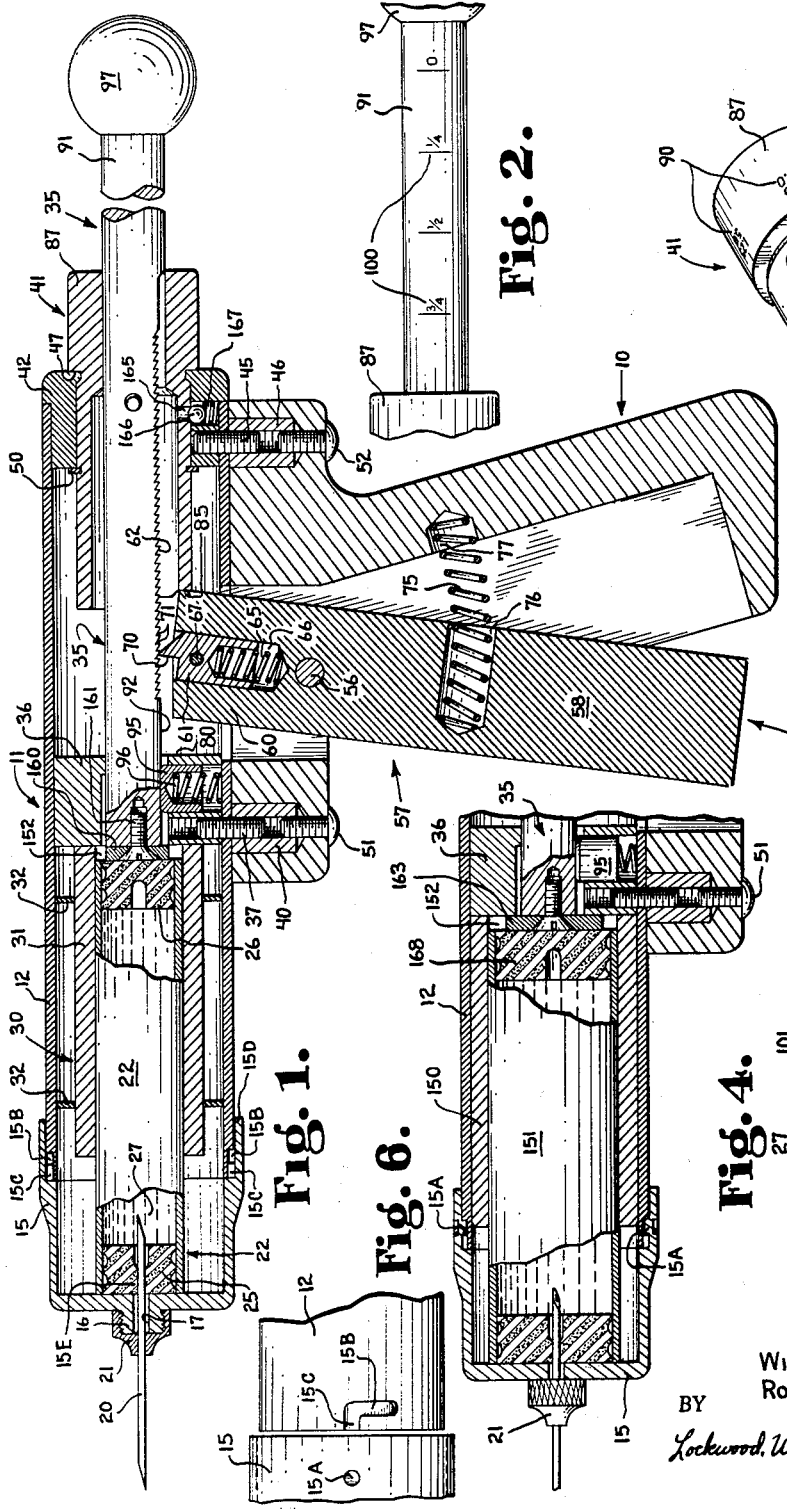
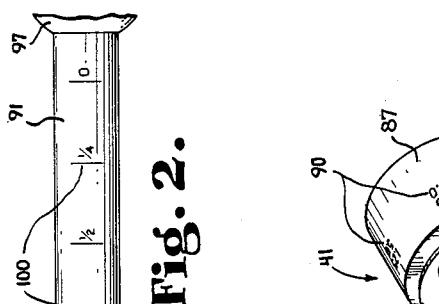
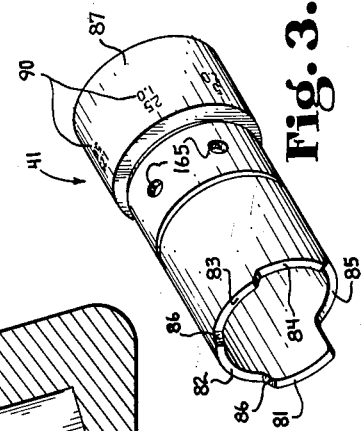
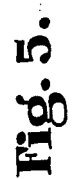
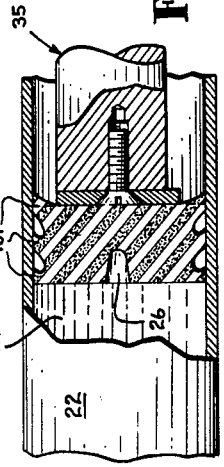
INVENTOR.
WILLIAM S. MAPEL and
ROBERT D. JENKINS
BY
Lockwood, Woodard, Smith & Weikart
Attorneys

United States Patent Office 3,141,583
Patented July 21, 1964

3,141,583
INJECTION GUN
William S. Mapel and Robert D. Jenkins, both of Indianapolis, Ind., assignors, by mesne assignments, to William L. Erickson, Indianapolis, Ind.
Filed Mar. 23, 1962, Ser. No. 181,898
5 Claims. (Cl. 222—309)

The present invention relates to a dispensing device finding important utility as an injection gun especially adapted for extrusion injection of viscous (as well as non-viscous) compositions into animals for veterinary (as well as nutritional) purposes.

It is frequently desirable to administer accurate doses of medicine to large groups of domestic animals such as cattle, hogs, fowl, etc. Medicine used for such veterinary purposes is commercially available contained in cartridges incorporating a sealing stopper which is movable longitudinally of the cartridge for dispensing the contents thereof. A primary object of the present invention is to provide an improved dispensing device particularly adapted for dispensing the contents of such cartridges and injecting them into animals in accurate doses.

Further objects of the present invention are to provide a dispensing device which is capable of dispensing accurate doses of viscous material without oozing of the material from the device between dispensing cycles; to provide a dispensing device which is conveniently, easily and rapidly adjustable as to the amount of each dose dispensed; to provide a dispensing device of the above character which is relatively simple and inexpensive in construction and to provide an improved dispensing device of the above character adapted to receive a replaceable cartridge containing a multiple-shot quantity of the material to be dispensed and in which the cartridges are readily and quickly replaceable.

Related objects and advantages will become apparent as the description proceeds.

One embodiment of the present invention comprises a dispensing gun including a cartridge receiving barrel, a first plunger adapted to be advanced in a cartridge received in said barrel, intermittently operable trigger actuated mechanism to impose dispensing force on said plunger to advance it in said cartridge, a second plunger reciprocably mounted on said barrel, resilient means acting between said second plunger and barrel and urging said second plunger against said first plunger whereby said second plunger opposes movement of said first plunger by frictional force, the force imposed by said trigger actuated mechanism on said first plunger being many times greater than the frictional force imposed by said second plunger on said first plunger.

The full nature of the invention will be understood from the accompanying drawings and the following description and claims.

FIG. 1 is a vertical longitudinal section af a dispensing gun embodying the present invention.

FIG. 2 is a fragmentary side elevational view of a portion of the structure illustrated in FIG. 1.

FIG. 3 is a perspective view of an annular stop member forming a part of the structure of FIG. 1.

FIG. 4 is a fragmentary longitudinal vertical section similar to FIG. 1 of an alternative embodiment of the present invention.

FIG. 5 is a fragmentary view similar to FIG. 1 showing the gun immediately after an injection.

FIG. 6 is a fragmentary side elevation of the forward portion of the barrel with a portion of a cap removably attachable thereto showing the means for attachment of these two parts.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a dispensing gun which has a downwardly extending grip 10 and a forwardly projecting barrel 11. The barrel includes a cylindrical member 12 having a cap 15 removably mounted thereon. The manner of mounting the cap 15 is shown in greater detail in FIGS. 4 and 6. It will be noted that the cap has formed therein two inwardly projecting tits 15A which are received in two outwardly-facing L-shaped cam indentations 15B for locking the cap on the barrel. These tits 15A are best shown in FIG. 4.

At the forward end of the cap 15, there is provided a threaded nipple 16 having an opening 17 therethrough which communicates with the interior of the barrel and receives one end of a needle 20 fixedly mounted at its central portion upon an internally threaded cap 21 sized for reception on the nipple 16.

A cartridge 22 is received within the barrel and has stoppers 25 and 26 in its opposite ends which seal off those ends and prevent leakage of the viscous material 27 contained within the cartridge. The cartridge is mounted centrally within the barrel by means of an adapter 30 which includes a cylindrical sleeve 31 having the same internal diameter as the external diameter of the desired cartridge 22. The adapter 30 further includes a pair of annular discs 32 fixed to the external surface of the sleeve 31 and having an outside diameter equal to the internal diameter of the cylinder 12. The adapter 30 is slidably receivable within the cylinder 12 and the cartridge 22 is slidably receivable within the adapter 30.

Thus, it can be appreciated that the desired cartridge 22 may be readily and quickly mounted within the barrel by sliding it into the adapter 30 and by moving the cap 15 axially onto the cylinder 12 so that the cap bears against the forward end of the cartridge. When the cap is so axially moved, the tits 15A move into the axially extending portions 15C of the L-shaped indentations 15B. Such axial movement causes the needle 20 to pierce the forward stopper 25 in the manner shown providing communication between the needle 20 and the material 27 contained within the cartridge. The cap 15 has an axially extending skirt 15D which guides the cap in its axial movement onto the barrel and thus insures that the needle is not canted in its piercing action and moves directly through the thin central portion 15E of the stopper 25. It will be noted that the present structure permits complete piercing of the stopper before the cap 15 is rotated to lock it in place thus eliminating the possibility of a portion of the stopper 25 being inserted in the needle by rotation of the needle during piercing.

A plunger 35 is mounted for longitudinal movement within the barrel 11 by means of a guide member 36 fixed in position by a screw 37 extending through the wall of the cylinder 12 and threaded into a mounting member 40. The plunger 35 is also supported for longitudinal movement by means of a rotary stop 41 rotatably mounted upon a stop housing 42 fixed to the breach end of the barrel cylinder 12 by a screw 45 which extends through the cylinder and is threaded into a mounting member 46. The rotary stop 41 is retained against longitudinal movement with respect to the barrel by means of abutment surface 47 on the stop and a snap ring 50 received within a suitable annular groove in the stop.

The grip 10 is secured to the barrel 11 in a fixed manner by reception upon the members 40 and 46 which extend into suitably shaped apertures in the grip. Screws 51 and 52 extend through suitable apertures in the grip and are threaded into the mounting members 40 and 46 to fix the grip in place.

A lever-pawl assembly 55 is pivotally mounted upon the grip at 56. The lever-pawl assembly includes a lever 57 having a long lever arm 58 positioned for squeezing by the hand and having a short lever arm 60 which projects upwardly into the cylinder 12. A pawl 61 is slidably mounted within the upper end of the lever 57 and is urged into engagement with the teeth of rack 62 on the plunger 35 by means of a compression spring 65 received within the bore 66 which also receives the pawl. It should be mentioned that the teeth of rack 62 are equally spaced. The lever 57 has a pair of longitudinally extending slots (not shown) which receive a pin 67 extending transversely through the pawl 61 and fixed thereto, the longitudinally extending slots functioning to guide the pawl and to maintain it with its flat surface 70 parallel to the flat surfaces 71 of the rack 62 whereby the pawl is always in position for engagement with those surfaces.

The long lever arm 58 of the lever is yieldably held forwardly in the position shown by means of a compression spring 75 received within bores 76 and 77 in the lever and grip, respectively, whereby the short lever arm is yieldably held in engagement with the rotary stop 41. Thus, one limit of the travel of the lever is its engagement with the rotary stop and the other limit of travel of the lever is the engagement of the short lever arm 60 with the surface 80 of the guide member 36. The spacing of these two limiting surfaces may be easily controlled in manufacture thus making possible a controlled length of stroke and controlled dosage.

Referring to FIG. 3, the rotary stop 41 has at its forward face a plurality of progressively forwardly spaced stop surfaces 81–85 which are connected by sloping cam surfaces 86. In order to adjust the travel of the lever 55, it is only necessary to grasp the rotary stop at its easily accessible enlarged portion 87 and rotate it until a desired one of its stop surfaces 81–85 is in the lowermost position as shown for the stop surface 85 in FIG. 1.

The rotary stop 41 may be calibrated as shown at 90 and the stop housing 42 provided with a suitable indicating line for notifying the user of the setting of the device.

It will be evident that the material 27 within the cartridge is dispensed by a full squeeze of the lever 57 which causes the pawl 61 to engage the rack 62 and to drive the plunger forwardly causing the stopper 26 to move forwardly and force the viscous material 27 through the needle 20. By adjusting the travel of the lever 55 through the rotation of the rotary stop 87, the amount of material 27 dispensed for a given squeeze can be accurately adjusted. The sloping cam surfaces 86 make possible the changing of the adjusted position of the lever from one stop surface to another against the force of the spring 75.

The plunger 35 includes a generally cylindrical body 91 having a flattened portion 92 thereon, a portion of which has the teeth 62 formed therein. The flattened portion 92 is frictionally engaged by a plunger 95 slidably mounted within the guide member 36 and urged into frictional engagement with the plunger 35 by means of a compression spring 96 acting between the cylinder 12 and the plunger 95.

The plunger 35 further includes a ball 97 fixed to the extending end of the plunger and facilitating withdrawal of the plunger after the cartridge has been exhausted. In order to withdraw the plunger, it is rotated within the guide 36 and stop 87 and against the urging of the springs 65 and 96 until the pawl 61 no longer engages the teeth 62. The plunger is then free to be retracted to the position illustrated in FIG. 1.

It should be mentioned that the plunger has a plurality of markings 100 on its cylindrical portion 91 which indicate the amount of material left within the cartridge.

It will be appreciated that the present invention provides a device which is particularly adapted for driving the plunger 35 forwardly with a strong force whereby the viscous material 27 can be forced through the needle 20. If the device were so designed that the plunger was held in position after each such avdance, there would be a tendency for the viscous material to ooze from the needle 20. This would result from the fact that the stopper 26 assumes the position shown in FIG. 5 after each advance of the plunger. The illustration of FIG. 5 is exaggerated; however, it will be noted that the annular sealing rings 101 extending around the outer periphery of the stopper are bent rearwardly when the stopper is moved forward. If the plunger 35 were held in its advanced position, these sealing rings 101 would return to the straight position shown in dotted lines in FIG. 5 and would cause oozing of the viscous material 27. This effect is eliminated by making the spring 96 sufficiently weak as to permit the plunger 35 to retract under the action of the rings 101 returning to their straight radially extending position. Thus, the frictional force between the plunger 95 and the plunger 35 is sufficiently small to prevent oozing from the needle but is sufficiently great to retain the plunger against further withdrawal or retraction away from the stopper 26 (should the plunger rotate to a position wherein the pawl 61 does not engage the rack 62 and also when the lever 57 is released after an injection). Thus, the plunger always remains in engagement with the stopper 26 whereby each dose is accurately dispensed.

Referring to FIG. 1, it will be noted that when the lever 57 is released after an injection stroke of the plunger 35, the short lever arm 60 moves the pawl surface 70 to a position that is between the flat surfaces 70 on the rack. Thus, plunger 35 is free to retract to allow the stopper 26 to move to the dotted line position even though lever 57 has moved to the position of FIG. 1 and blocks any substantial amount of rearward movement of the plunger.

Referring now to FIG. 4, there is illustrated an alternative embodiment which is identical to the above described embodiment with the exception that a different adapter 150 and a different cartridge 151 is used. It should be understood that the present invention includes the concept of a plurality of adapters such as 30 and 150 all of which have the same outer diameter but which have differing inner diameters to accommodate cartridges of different sizes. In the embodiment illustrated in FIG. 4, the adapter 150 has no annular discs such as 32 but instead consists of a cylindrical sleeve. It will be noted that the plunger 35 and particularly the portion 91 of the plunger has a diameter which is less than the diameters of the openings 152 through the adapters 30 and 150 so that the plunger can be advanced therethrough and through a cartridge contained within the adapters.

Referring again to FIG. 1, the forward end of the plunger 35 has a rigid pad 160 fixed thereto by screw 161. This pad has a diameter only slightly less than the outside diameter of the stopper 26 so that a uniform force is exerted across the pad by the plunger 35. This pad may be removed and replaced by the pad 163 (FIG. 4) which has a diameter only slightly less than the outside diameter of the stopper 168. Various other sized pads may be provided depending on the size of the adapter and cartridge being used.

Referring to FIGS. 3 and 1, the annular rotary stop 41 has around its outer periphery a plurality of apertures 165 each of which is positioned centrally of but spaced axially of a respective one of the stop surfaces 81–85. The stop housing 42 has an aperture therethrough which receives a ball 166 and a compression spring 167 which which acts between the ball 166 and the cylindrical member 12 to urge the ball into the various apertures 165. Thus, the ball acts as a retaining or positioning means retaining the stop with a desired stop surface down until the stop member is rotated by the user to a different position.

It will be evident from the above description that the present invention provides an improved dispensing device which is particularly adapted for dispensing the contents of replaceable multiple shot cartridges in an accurate and non-wasteful manner. It will also be evident that the present invention provides a dispensing device which is conveniently, easily and rapidly adjustable as to the amount of each dose dispensed. It should be understood that the amount of each dose can be controlled not only by rotating the rotary stop 41 but also by changing the cartridge size. Thus, for example, five rotary stop positions plus five cartridge sizes could provide twenty-five different dosage levels. It will further be evident that the present invention provides a dispensing device of the above character which is relatively inexpensive and simple in construction.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A dispensing gun comprising a pistol-like body having a downwardly extending grip and having a forwardly projecting barrel to receive a cartridge, a plunger movable longitudinally of the barrel and into a cartridge contained therein to dispense the contents thereof from said barrel, equally spaced ratchet teeth on said plunger, a pawl below said plunger in engagement with said teeth, a lever pivoted in said body and having a short lever arm reciprocably receiving said pawl and a long lever arm extending downward into position to be manually squeezed toward said grip, a spring received within said short lever arm and acting between said short lever and pawl to urge said pawl against said teeth, an annular stop member mounted on said body at the rear of said barrel for rotation about a forwardly extending axis, said stop member having a plurality of progressively forwardly spaced stop surfaces on the forward face thereof, a spring acting between said grip and long lever arm to yieldably retain said short lever arm in engagement with the lowermost of said stop surfaces, said annular stop member having a plurality of apertures around its outer periphery, each of said apertures corresponding to one of said stop surfaces, a ball reciprocably mounted on said body, resilient means acting between said body and ball and urging said ball against said annular stop member at such a location as to selectively engage said apertures for retaining said annular stop member with a selected stop surface downward, means fixed with relation to said barrel for limiting the forward travel of said short lever arm, said stop surfaces limiting the movement of said short arm in one direction while said fixed means limits the movement of said short arm in the other direction whereby the travel of said lever and plunger for a given squeeze of said lever can be adjusted by rotation of said annular stop member.

2. A dispensing gun comprising a pistol-like body having a downwardly extending grip and having a forwardly-projecting cartridge-receiving barrel, a plunger movable longitudinally of said barrel for dispensing material contained within a cartridge in said barrel, intermittently-operable trigger-actuated mechanism for driving said plunger forwardly within said barrel, said mechanism including a lever pivoted in said body and having a first lever arm extending upwardly into said barrel and a second lever arm extending downwardly forward of said grip into a position to be manually squeezed toward said grip, said plunger having a rack thereon, a pawl received in said first lever arm and engaging said rack, an annular stop member mounted on said body in the rear of said barrel for rotation about a forwardly extending axis, said annular stop member being retained against movement longitudinally of said barrel and having a plurality of progressively forwardly spaced stop surfaces on the forward face thereof and spaced radially of said axis, a spring acting between said grip and said second lever arm to yieldably retain said first lever arm in engagement with the lowermost of said stop surfaces, means fixed with relation to said barrel for limiting the forward travel of said first lever arm, said stop surfaces limiting the movement of said first arm in one direction while said fixed means limits the movement of said first arm in the other direction whereby travel of said lever for a given squeeze of said lever can be adjusted by rotation of said annular stop member, a plurality of adapters having an external configuration adapted to closely fit within said barrel, each of said adapters having a different sized opening therethrough centrally thereof adapted to receive a different sized cartridge therein, said plunger having a cross section smaller than the openings through said adapters whereby said plunger is movable through said openings, said rotary stop surfaces being so spaced and said adapter openings being so sized as to provide a multiple of dosages for a given squeeze of said lever.

3. A dispensing gun comprising a pistol-like body having a downwardly extending grip and having a forwardly-projecting barrel to receive a cartridge, a plunger movable longitudinally of the barrel and into a cartridge contained therein to dispense the contents thereof from said barrel, equally spaced ratchet teeth on said plunger, a pawl below said plunger in engagement with said teeth, a lever pivoted in said body and having a short lever arm mounting said pawl and a long lever arm extending downwardly into position to be manually squeezed toward said grip, a spring acting between said short lever arm and pawl to urge said pawl against said teeth, an annular stop member mounted on said body for rotation about a forwardly extending axis, said stop member having a plurality of progressively forwardly spaced stop surfaces, a spring acting between said grip and long lever arm to yieldably retain said long lever arm in a forward position, said annular stop member having a plurality of apertures each equally spaced from said forwardly extending axis, each of said apertures corresponding to one of said stop surfaces, a ball reciprocably mounted on said body, resilient means acting between said body and ball and urging said ball against said annular stop member at such a location as to selectively engage said apertures for retaining said annular stop member with a selected stop surface in the path of said short lever arm, means fixed with relation to said body for limiting the travel of said short lever arm, said means and selected stop surface being on opposite sides of said short lever arm, said stop surfaces limiting the movement of said short arm in one direction while said fixed means limits the movement of said short arm in the other direction whereby the travel of said lever and plunger for a given squeeze of said lever can be adjusted by rotation of said annular stop member.

4. A dispensing gun comprising a pistol-like body having a downwardly extending grip and having a forwardly-projecting cartridge-receiving barrel, a plunger movable longitudinally of said barrel for dispensing material contained within a cartridge in said barrel, intermittently-operable trigger-actuated mechanism for driving said plunger forwardly within said barrel, said mechanism including a lever pivoted in said body and having a first lever arm extending upwardly into said barrel and a second lever arm extending downwardly forward of said grip into a position to be manually squeezed toward said grip, said plunger having a rack thereon, a pawl mounted on said first lever arm and engaging said rack, an annular stop member mounted on said body for rotation about a forwardly extending axis, said annular stop member being retained against movement longitudinally of said barrel and having a plurality of progressively forwardly spaced stop surfaces spaced radially of said axis, a spring acting between said grip and said second lever arm to yieldably retain said second lever arm in a forward position, means fixed with relation to said barrel for limiting travel of said first lever arm, said stop surfaces limiting the movement of said first arm in one direction while said fixed means limits the movement of said first arm in the other direction whereby travel of said lever for a given squeeze of said lever can be adjusted by rotation of said annular stop member, a plurality of adapters having an external configuration adapted to closely fit within said barrel, each of said adapters having a different sized opening therethrough centrally thereof adapted to receive a different sized cartridge therein, said plunger having a cross section smaller than the openings through said adapters whereby said plunger is movable through said openings, said rotary stop surfaces being so spaced and said adapter openings being so sized as to provide a multiple of dosages for a given squeeze of said lever.

5. A multiple injection gun for successively administering injection doses from a multiple-dose cylindrical cartridge of viscous material, comprising a pistol-like body having a downwardly extending grip and having a forwardly projecting barrel to receive a cartridge, a dispensing tube at the forward end of the barrel to communicate with a cartridge therein, a plunger movable longitudinally of the barrel and into a cartridge contained therein to dispense the contents thereof through the dispensing tube, equally spaced ratchet teeth on said plunger, a pawl below said plunger in engagement with said teeth, a lever pivoted in said body and having a short lever arm mounting said pawl and a long lever arm extending downwardly into position to be manually squeezed toward said grip, said body having a pair of abutment surfaces which limit the forward and rearward movement of said short lever arm, spring means acting between said body and said long lever arm and urging said long lever arm forward and said short lever arm rearward into engagement with one of said abutment surfaces, the portion of said pawl which engages said ratchet teeth being moved through a distance which is greater than the distance between a whole number of ratchet teeth when said short lever arm travels from said one abutment to the other whereby oozing of viscous material from said tube is prevented.

References Cited in the file of this patent

UNITED STATES PATENTS

| | | |
|---|---|---|
| 1,687,324 | Cook | Oct. 9, 1928 |
| 1,718,605 | Smith | June 25, 1929 |
| 1,997,129 | Taylor et al. | Apr. 9, 1935 |
| 2,115,591 | Sherbondy | Apr. 26, 1938 |
| 2,168,493 | Plews | Aug. 8, 1939 |
| 2,550,394 | Young et al. | Apr. 24, 1951 |
| 2,717,724 | Martin | Sept. 13, 1955 |
| 2,735,431 | Swanson | Feb. 21, 1956 |
| 2,902,190 | Hosler | Sept. 1, 1959 |
| 3,051,172 | Bruchhaus | Aug. 28, 1962 |